United States Patent
Rogoyski

(10) Patent No.: US 7,556,194 B2
(45) Date of Patent: Jul. 7, 2009

(54) METHOD AND APPARATUS TO INDICATED PROXIMITY OF A MEDIUM AND UPDATE A USER INVENTORY

(75) Inventor: Jan Rogoyski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 11/351,023

(22) Filed: Feb. 9, 2006

(65) Prior Publication Data

US 2007/0181682 A1    Aug. 9, 2007

(51) Int. Cl.
G06Q 30/00    (2006.01)
G06F 19/00    (2006.01)

(52) U.S. Cl. ..................................... 235/385
(58) Field of Classification Search .............. 235/385; 705/22, 28

See application file for complete search history.

(56) References Cited

U.S. PATENT DOCUMENTS

| | | | |
|---|---|---|---|
| 4,141,078 A * | 2/1979 | Bridges et al. ............. | 235/375 |
| 6,195,006 B1 * | 2/2001 | Bowers et al. ............ | 340/572.1 |
| 6,902,111 B2 | 6/2005 | Han et al. | |
| 6,994,252 B2 * | 2/2006 | Frich .......................... | 235/381 |
| 2004/0254676 A1 | 12/2004 | Blust et al. | |
| 2005/0159863 A1 | 7/2005 | Howard et al. | |
| 2005/0180566 A1 | 8/2005 | Ryal | |
| 2006/0178954 A1 * | 8/2006 | Thukral et al. ................ | 705/28 |

* cited by examiner

Primary Examiner—Jamara A Franklin
(74) Attorney, Agent, or Firm—Yee & Associates, P.C.; Jeffrey S. LaBaw

(57) ABSTRACT

A computer implemented method, computer usable code and apparatus for locating a desired medium having a radio frequency transponder having a product unique identifier, wherein the desired medium has a medium name. A radio frequency reader or reader looks up the medium unique identifier from a user inventor based on the medium name. The reader sends an interrogate signal. The reader receives a radio frequency response having a candidate identifier. The reader determines whether the candidate identifier matches search criteria and outputs a status change to a user interface.

3 Claims, 4 Drawing Sheets

METHOD AND APPARATUS TO INDICATED PROXIMITY OF A MEDIUM AND UPDATE A USER INVENTORY

BACKGROUND OF THE INVENTION

1. Field of the Invention

The present invention relates generally to tracking the location of a tangible object. More specifically, the present invention relates to a method, apparatus, and computer usable code to locate a desired medium.

2. Description of the Related Art

Evolving technologies allow products to be tagged with inexpensive radio frequency transponders and then tracked by devices that can read the information encoded into the radio frequency transponder, which is also referred to as a transponder. Radio frequency identification ("RFID") uses low-powered radio transmitters to read data stored in a transponder at distances up to 200 feet away. Applications of this technology include tracking assets, managing inventory, automatic vehicle identification, highway toll collection, and authorizing payments.

Developers first made RFID systems in the 1940s. An initial application of the technology allowed the U.S. government to use transponders to distinguish between friendly and enemy aircraft. Air traffic controllers continue to use transponders for aircraft tracking. In addition to tracking aircraft, the commercial aviation industry has used RFID tags to route baggage and increase air security. In the 1970s, the U.S. government used RFID systems for tracking livestock and nuclear material. Recent applications allow a vendor to authenticate customers in order to pay for food or gas.

Commercial applications generally operate in unlicensed frequency bands, with 125 KHz and 13.56 MHz being the most common. The greater the bandwidth the more information a RFID tag can hold. For instance, a 13.56 MHZ tag can hold as much as 2,000 bits of data, roughly 30 times the information that may be transmitted using a 125 KHz tag. Active RFID tags are equipped with a battery that allows an active tag to transmit a signal to a reader. These tags often provide the greatest range, up to 200 feet, but are more expensive than other tags. Passive RFID tags are not battery powered. Instead, this type of device draws power from the electromagnetic waves emitted from the receiver-transmitter or RFID reader. The read range of these tags is generally under three meters. Semi-passive RFID tags have batteries like active RFID tags, but the battery is only used to power the tag's microchip circuitry. Semi-passive tags also have longer read ranges than passive tags.

One example of RFID use is inventory control, wherein items include attached RFIDs. Up to 2,000 bits of data are stored on a memory chip constructed in a button or integrated circuit card. Some tags include etching on a substrate, embedded in a paper or plastic tag. The information stored on the tag may include a unique product identification code, the place of product manufacture, and the place of sale. The tag may include a battery or it may be passive.

A RFID transmitter-receiver or reader generally includes a transmitter, a receiver and a digital control module connected to a transmitting antenna. The reader interrogates RFIDs, receives a response, and decodes the data. The reader passes that data on to a host system. The host system assimilates the data received from the product tags. The host system often provides reports used to track product inventory and sales.

SUMMARY OF THE INVENTION

The aspects of the present invention provide a computer implemented method, computer usable code, and apparatus for identifying proximity of a medium having a radio frequency transponder having a medium unique identifier. The medium has a medium name. A radio frequency reader looks up the medium unique identifier from a user inventory based on the medium name. The radio frequency reader sends an interrogate signal. The radio frequency reader receives a radio frequency response having a candidate identifier. The radio frequency reader outputs a status change indication to a user interface. The status change indication indicates a location zone.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment of the present invention when read in conjunction with the accompanying drawings, wherein:

DETAILED DESCRIPTION OF THE PREFERRED EMBODIMENT

Figure 1A:
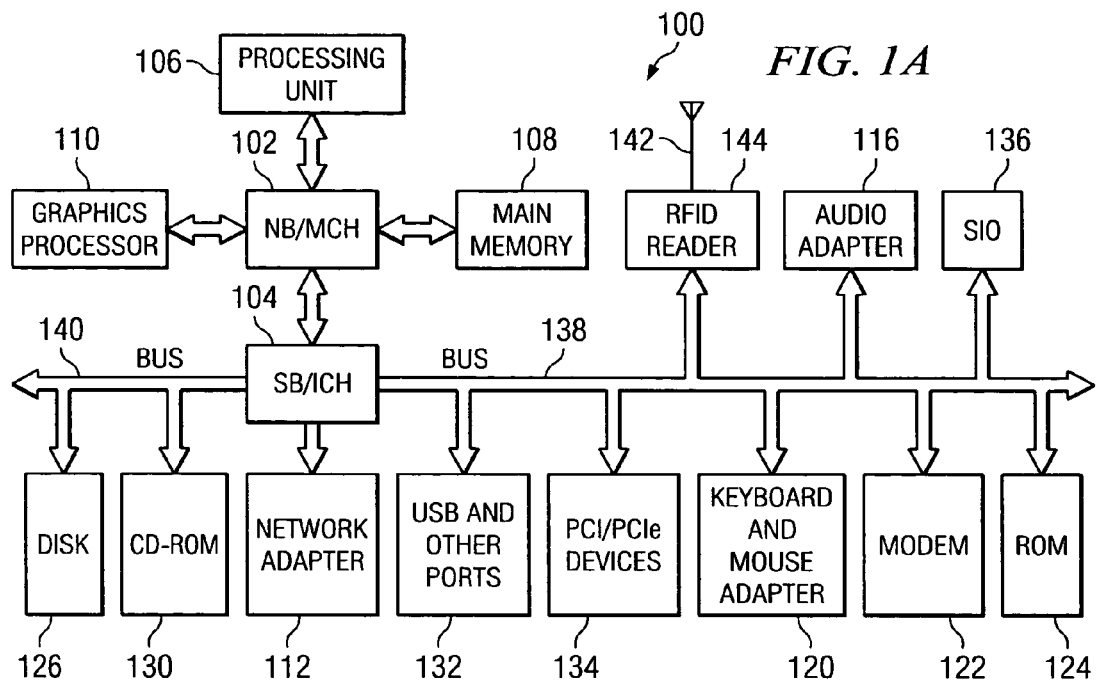
FIG. 1A shows a block diagram of a radio frequency reader and a user interface in accordance with an illustrative embodiment of the present invention.

With reference now to the figures and in particular with reference to FIG. 1A, a block diagram of a data processing system is shown in which embodiments of the present invention may be implemented. In the depicted example, data processing system 100 employs a hub architecture including north bridge and memory controller hub (MCH) 102 and south bridge and input/output (I/O) controller hub (ICH) 104. Processing unit 106, main memory 108, and graphics processor 110 connect to north bridge and memory controller hub 102. Graphics processor 110 may connect to north bridge and memory controller hub 102 through an accelerated graphics port (AGP) or graphics processor 110.

In the depicted example, local area network (LAN) adapter 112, audio adapter 116, keyboard and mouse adapter 120, modem 122, read only memory (ROM) 124, universal serial bus (USB) ports and other communications ports 132, and PCI/PCIe devices 134 connect to south bridge and I/O controller hub 104 through bus 138. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

Hard disk drive 126 and CD-ROM drive 130 connect to south bridge and I/O controller hub 104 through bus 140. Hard disk drive 126 and CD-ROM drive 130 may use, for example, an integrated drive electronics (IDE) or serial advanced technology attachment (SATA) interface. Super I/O (SIO) device 136 may be connected to south bridge and I/O controller hub 104.

In addition, radio frequency identifier (RFID) reader 144 connects to bus 138 and may be controlled through bus 138. RFID reader 144 may comprise a reader transmitter for transmitting an interrogate signal and a reader receiver receiving a radio frequency response corresponding to the interrogate signal. In operation, bus 138 and devices attached thereto may operate as a controller in relation to the operation of RFID reader 144.

An operating system runs on processing unit 106 and coordinates and controls various components within data processing system 100 in FIG. 1A. The operating system may be a commercially available operating system, such as Advanced Interactive executive (AIX®), which is available from IBM Corporation. AIX is a registered trademark of IBM Corporation.

Embodiments of the present invention permit a user to create an inventory for media owned by, or controlled by, a user. The user may operate the radio frequency reader of FIG. 1A to locate a recorded medium or a desired medium that the user wishes to locate that had been misplaced. A recorded medium is any medium with data recorded on it, and more particularly, means a medium that may be written once and appended to, for example, a notebook for classroom notes written in pen. Recorded media includes CDs and DVDs, regardless of the data type stored therein. Recorded media also includes manila folders and other forms of jacket within which various additional recorded media may be stored. However, the recorded media does not include boxes and packing material typically used to insulate the recorded medium during the shocks of transport through commerce. The desired medium may be a magazine, a book or a document. In addition, the desired medium may be a backup disk written by the user, wherein the blank disk either is manufactured with a unique RFID or the user adds the unique RFID at the time of writing to the disk. The user enters a medium identifier through the user interface to identify the medium that the user wishes to locate. The medium name may be any identifier that the user associates with the medium. The medium name may be, for example, a name, a number, or some alpha numeric. The radio frequency reader interrogates the local area by transmitting an interrogate signal and receiving a response from any nearby radio frequency transponders within range of the radio frequency reader. If a nearby radio frequency transponder carries a RFID that correlates with the medium name given by the user, the radio frequency reader will indicate that the recorded medium has been found. In this way, a user may walk from area to area carrying the radio frequency reader and identify a recorded medium that may be hidden from view but within range of the radio frequency reader.

Figure 1B:
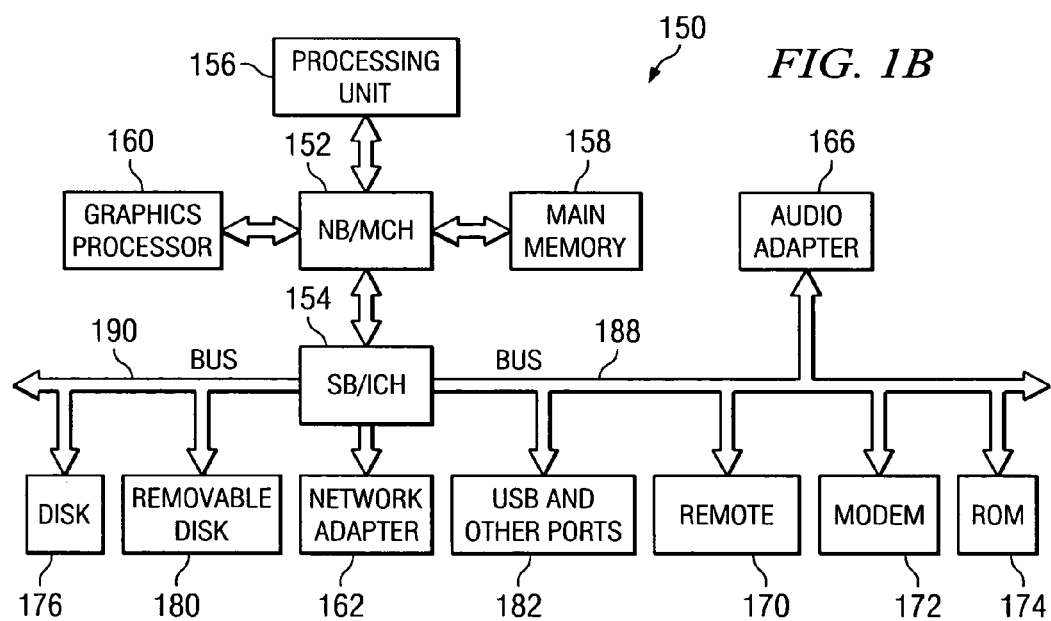
FIG. 1B shows a block diagram of a disk media player in which embodiments of the present invention may be implemented.

FIG. 1B shows a block diagram of a disk media player in which embodiments of the present invention may be implemented. In the depicted example, disk media player 150 employs a hub architecture including north bridge and memory controller hub (MCH) 152 and south bridge and input/output (I/O) controller hub (ICH) 154. Processing unit 156, main memory 158, and graphics processor 160 connect to north bridge and memory controller hub 152. Graphics processor 160 may connect to north bridge and memory controller hub 152 through an accelerated graphics port (AGP) or graphics processor 160.

In the depicted example, local area network (LAN) adapter 162, audio adapter 166, wireless remote 170, read only memory (ROM) 174, and universal serial bus (USB) ports and other communications ports 182 connect to south bridge and I/O controller hub 154 through bus 188. ROM 174 may be, for example, a flash binary input/output system (BIOS).

Disk storage 176, and removable disk drive 180 connect to south bridge and I/O controller hub 154 through bus 190. Removable disk drive 180 may use, for example, an integrated drive electronics (IDE) or serial advanced technology attachment (SATA) interface. In addition, removable disk drive 180 may read and write to DVD, CD, Blu-ray™, and other formats. Blu-ray is a trademark of Blu-ray Disc Association.

An operating system may run on processing unit 156 and coordinates and controls various components within disk media player 150 in FIG. 1B. The operating system may be a commercially available operating system, such as Advanced Interactive executive (AIX®).

Figure 2:
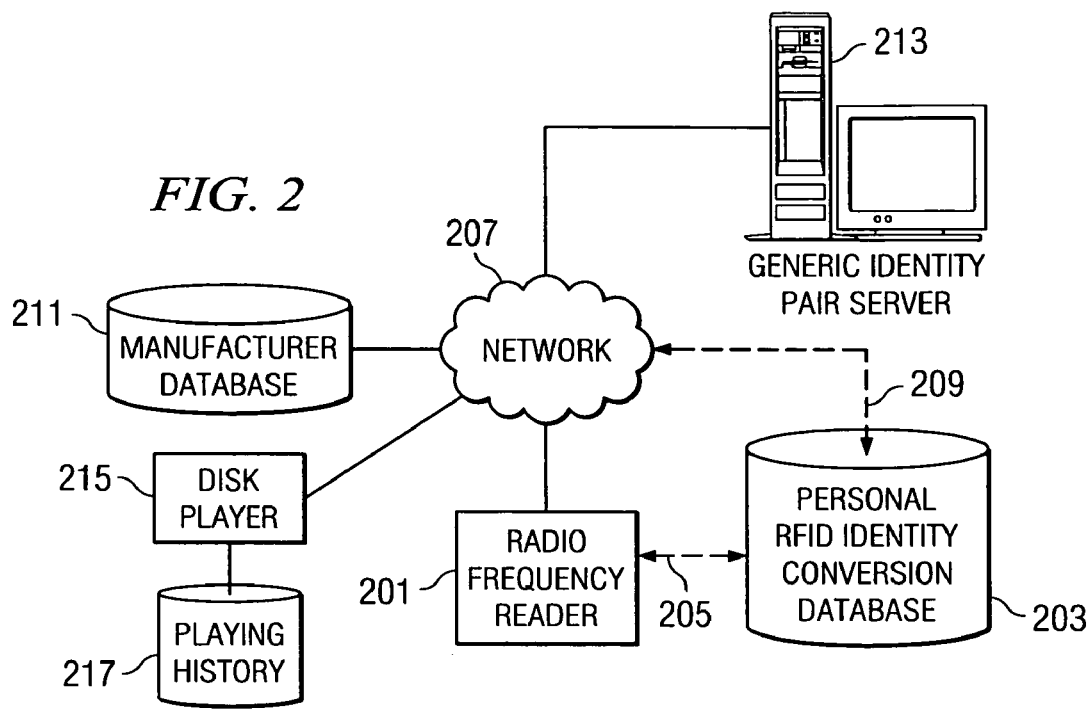
FIG. 2 shows a block diagram of a radio frequency reader and user interface connected to a network in accordance with an illustrative embodiment of the present invention.

FIG. 2 shows a block diagram of the radio frequency reader and user interface connected to a network in accordance with an illustrative embodiment of the present invention. Radio frequency reader 201 may be, for example, data processing system 100 of FIG. 1A. Radio frequency reader 201 may interact with a personal RFID identity conversion database 203. A user inventory is a data structure that organizes media a user owns, wherein the user inventory is stored to a RFID identity conversion database. A user may enter a medium name to radio frequency reader 201. The user may transmit the medium name from the radio frequency reader 201 through network 207 to access manufacturer database 211. Manufacturer database 211 may carry a number of identity pairs that correlate a medium name with a medium unique identifier. A medium unique identifier is an identifier compact enough for storage to a radio frequency transponder, but large enough that each lot of identically recorded media may have a corresponding medium unique identifier that is distinct from every other lot. For example, a medium unique identifier may be 64 bits long, and be represented as hexadecimal "ABCD1234". The manufacturer database 211 may respond by sending the identity pair to radio frequency reader 201. Radio frequency reader 201 stores the identity pair to RFID identity conversion database 203. RFID identity conversion database 203 may be, for example, stored to disk 126 of FIG. 1A, accessible by local link 205. Alternatively, RFID identity conversion database 203 may be accessed by radio frequency reader 201 via link 209 wherein user inventory is stored at a central location by a third party owned server. RFID identity conversion database 203 contains the user inventory.

RFID identity conversion database 203 may store information associated with a user identifier, in addition to the user inventory. Such information includes any previous search criteria logged to a history file. In addition, the database may store a playing history for one or more disk players associated with the user. The database may also store content information, such as the title of songs on a particular medium, or even some of the lyrics. Search criteria is a criteria, established by the user, that the radio frequency reader uses to screen transponder information to those relevant to a user's input search scope.

An embodiment includes radio frequency reader 201 accessing a server based user inventory. Radio frequency reader 201 also may use network link 209 to transmit queries to and receive responses from RFID identity conversion database 203. As an alternative to using a manufacturer database 211 to obtain identity pairs, radio frequency reader 201 may communicate with generic identity pair server 213. Generic identity pair server 213 may be hosted by a service that carries identity pairs for a number of different manufacturers and provide such service on a fee basis or supported by commercial advertisement.

In addition, network 207 may facilitate coupling of radio frequency reader 201 to disk player 215. Disk player 215 may be, for example, disk media player 150 of FIG. 1B. Disk player 215 may store a playing history 217 to local storage. Such a playing history may include a list of frequently played media, or a list of recently played media. It is appreciated that coupling may occur via network 207 and the associated network adapters of radio frequency reader 201 and disk player 215. In addition, coupling may be via direct cable connection between the devices, or via local wireless connection.

The radio frequency reader 201 obtains a ready-made search criteria by coupling to the disk player and downloading a playing history. Radio frequency reader 201 provides a menu to permit the user to build search criteria, for example, on artist names, or on song lyrics. In addition, radio frequency reader 201 may provide a menu to permit a user to select previous search history information criteria, saving the user time in re-entering the same criteria twice.

Figure 3:
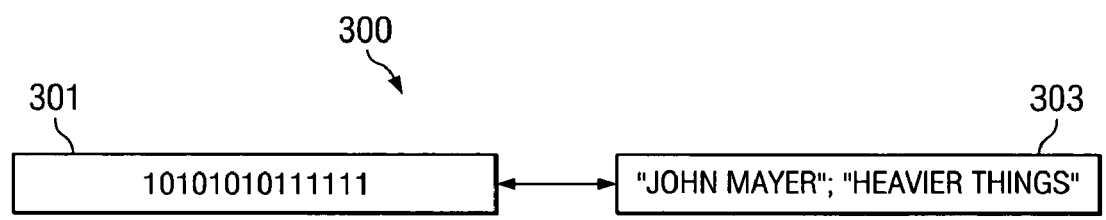
FIG. 3 shows a diagram of an identity pair in accordance with an illustrative embodiment of the present invention.

FIG. 3 shows a diagram of an identity pair in accordance with an illustrative embodiment of the present invention. Identity pair 300 is comprised of at least one medium unique identifier 301 and medium name 303. Medium unique identifier 301 contains a digital code, which may be coded in a received signal from a radio frequency transponder. A radio frequency transponder is also referred to as an RFID. In addition, medium name is the name commonly given to the recorded medium by the manufacturer or users of the recorded medium. For example, for a CD the medium name may include the name of the artist, John Meyer, and the name of the album, for example, Heavier Things. The medium name may serve as a search criteria when a user selects the medium name later for purposes of searching for the associated medium.

Figure 4:
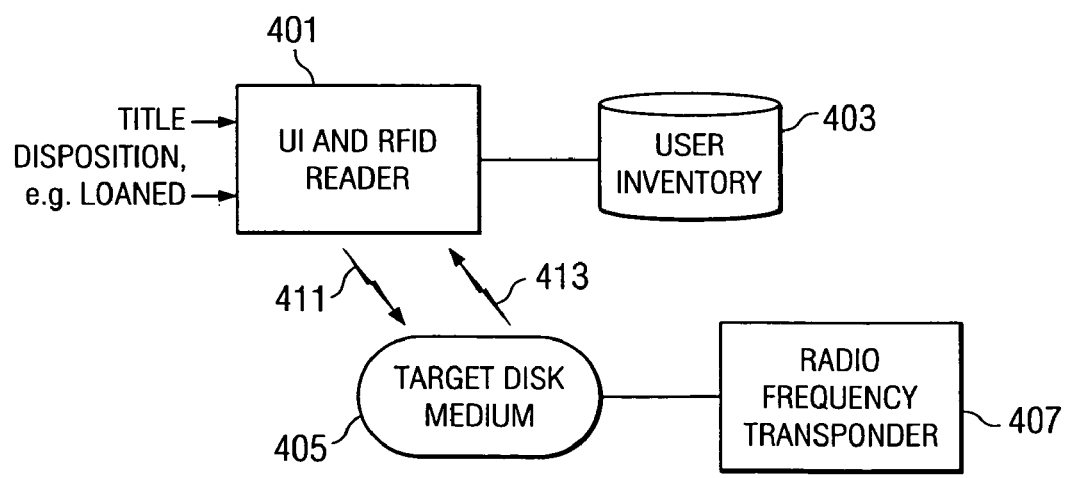
FIG. 4 shows a block diagram of a radio frequency reader and user interface interaction with a medium in accordance with an illustrative embodiment of the present invention.

FIG. 4 is a block diagram depicting a radio frequency reader and user interface interaction with a medium in accordance with an illustrative embodiment of the present invention. Radio frequency reader 401 may be, for example, radio frequency reader 144 of FIG. 1A. Radio frequency reader 401 connects to user inventory 403. When operated to locate nearby radio frequency transponders, radio frequency reader 401 transmits interrogate signal 411. Radio frequency reader 401 may include a reader transmitter for purposes of transmitting interrogate signal 411. Target disk medium 405 may be within range of radio frequency reader 401. Attached to target disk medium 405 is radio frequency transponder 407. Radio frequency transponder 407 may issue a radio frequency response 413 upon receiving interrogate signal 411. Radio frequency response 413 includes a candidate identifier. Candidate identifier is a medium unique identifier, for example, 301 of FIG. 3. Radio frequency reader 401 includes a reader receiver for receiving radio frequency response 413 and decoding the candidate identifier. Radio frequency reader 401 may include, for example, processing unit 106 of FIG. 1A to operate as a controller. Radio frequency reader 401 may include, for example, keyboard and mouse adapter 120 of FIG. 1A to operate as a user input interface. User input interface may receive user selections provided by the user to select a medium name or a picture or annotation associated with the recorded medium. Radio frequency reader 401 may include a graphics processor 110 of FIG. 1A to operate as a user output interface. User output interface may provide status details concerning a recorded medium, for example, whether a medium is checked out or otherwise unavailable.

Figure 5A:
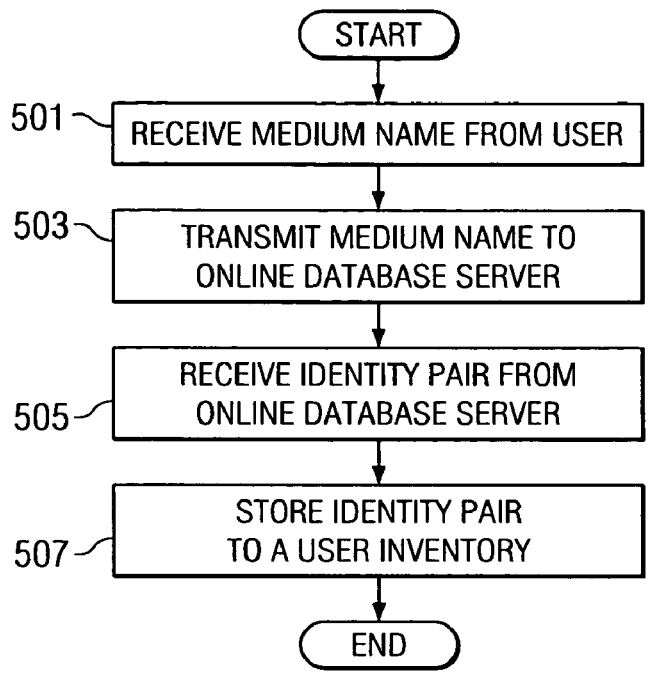
FIG. 5A shows a flowchart of the steps to build a user inventory of media in accordance with an illustrative embodiment of the present invention.

FIG. 5A shows a flowchart of the steps to build a user inventory of recorded media in accordance with an illustrative embodiment of the present invention. An illustrative embodiment of the invention may be according to data processing system 100 of FIG. 1A. A user may input a medium name to data processing system 100. The final selection of the name may be the result of a search through the database wherein content of the desired medium, such as a song title, or medium attributes such as artist name or year of publication is used to assist the user in selecting the desired medium name. A keyboard adapter receives the medium name from the user (step 501). The keyboard adapter may be keyboard and mouse adapter 120 of FIG. 1A. Alternatively, the radio frequency reader receives the medium name by a voice recognition program coupled, for example, to audio adapter 116 of FIG. 1A. Data processing system 100 has a network adapter. The network adapter may be, for example, network adapter 112 of FIG. 1A. Network adapter 112 transmits the medium name to an online database server (step 503). The online database server may respond with an identity pair, for example, including a radio frequency transponder code and the product name. Network adapter 112 receives the identity pair from online database server (step 505). In response to receiving the identity pair, the radio frequency reader stores the identity pair to a user inventory (step 507). The user inventory storage may be, for example, disk 126 of FIG. 1A.

Figure 5B:
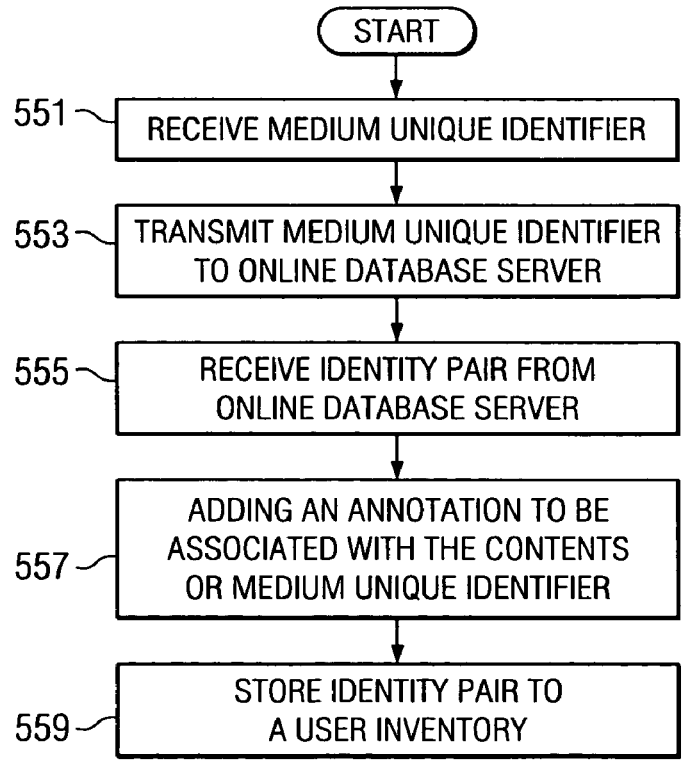
FIG. 5B shows a flowchart for collecting a medium unique identifier and updating a database with annotations concerning the medium unique identifier.

FIG. 5B shows a flowchart for collecting a medium unique identifier and updating a database with annotations concerning the medium unique identifier. A user may simply hold a radio frequency reader over a newly purchased disk medium. The radio frequency reader receives a medium unique identifier (step 551). Step 551 operates potentially in response to a prior interrogation signal. Radio frequency reader transmits the medium unique identifier to an online database server (step 553). Radio frequency reader receives an identity pair from the online database server (step 555). Step 555 may include a more robust reception wherein the database server may deliver content associated with the medium, typically text, for example, names of audio tracts stored therein. Content may be downloaded as a table of contents, although one skilled in the art would appreciate that alternative data structures may be employed. A content is a table of contents among other things. A user may review any content received. Steps 553 and 555 may comprise the activity of looking up a medium unique identifier. The user may choose to add an annotation to be associated with content (step 557). Step 557 indirectly associates the annotation with the medium unique identifier by virtue of the content association with medium unique identifier. Adding step 557 may include editing content.

In the absence of received content, the user may simply associate an annotation with the medium unique identifier. An annotation is a string added to a medium name or content wherein the annotation becomes associated with a medium unique identifier, and thus becomes a searchable term. A searchable term is a term that may be input to a radio frequency reader upon setting a search criterion. Radio frequency reader stores the annotation to a user inventor (step 559). Storing includes associating the medium unique identifier with the annotation.

Thus, a user may build or create an inventory of media owned or controlled by the user. The user inventory may be stored locally. Alternatively, generic identity pair server 213 of FIG. 2, stores the user inventory. The generic identity pair server may correlate a user to a user inventory with a user identifier which may be attached to later queries made to the generic identity pair server 213 of FIG. 2. In addition to reading and editing a single medium, the steps of FIG. 5B may operate on several responding transponders, each in their turn.

Figure 6:
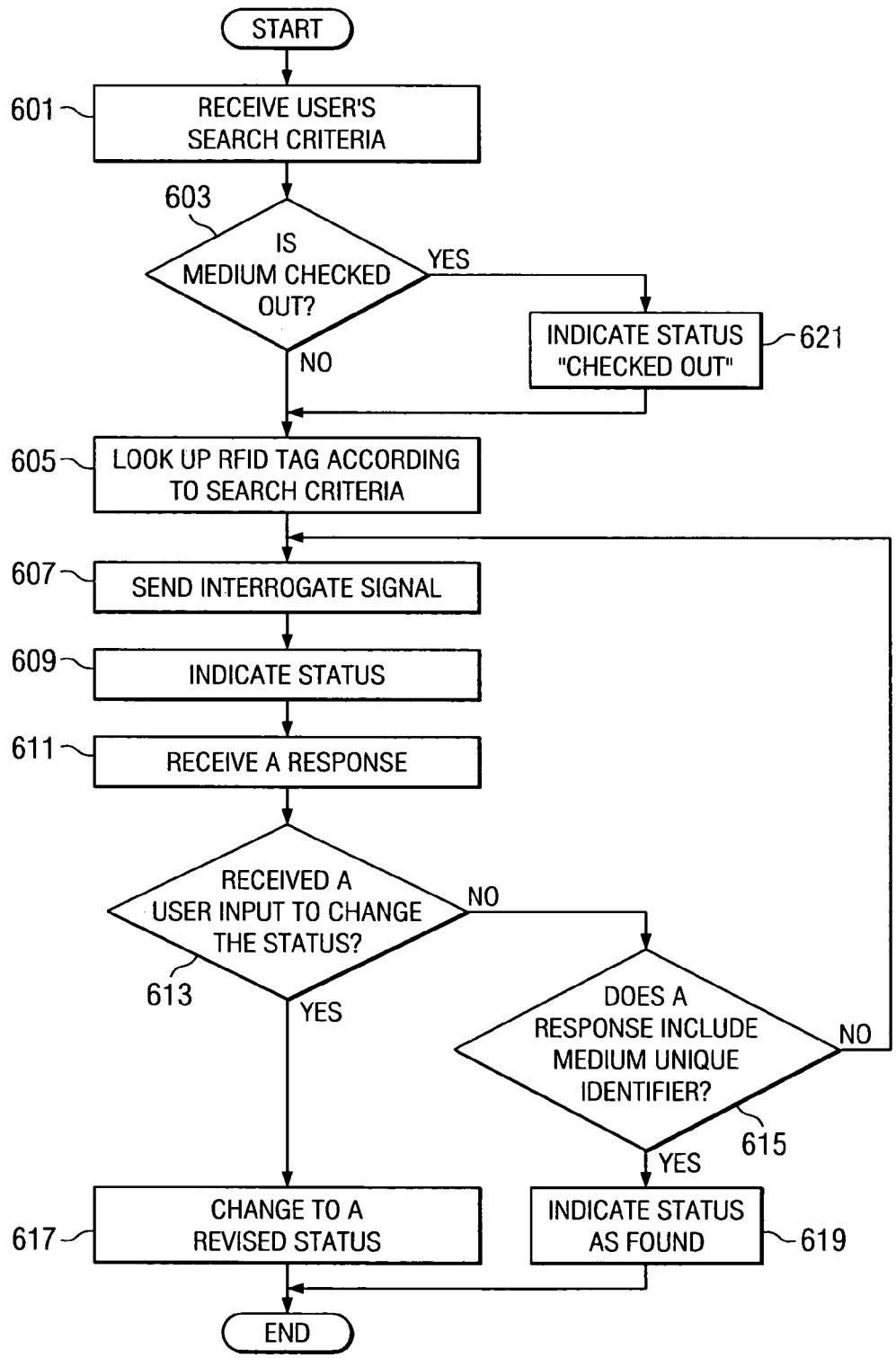
FIG. 6 shows a flowchart of the steps to determine a status of a medium in accordance with illustrative embodiment of the present invention.

FIG. 6 is a flowchart of the steps to determine a status of a medium in accordance with an illustrative embodiment of the present invention. The illustrative embodiment may be according to data processing system 100 of FIG. 1A. Data processing system 100 receives a user's search criteria (step 601). A search criteria is a selection or entry by a user of attributes associated with a medium. Such attributes comprise medium identity, medium name, album name, song name, or user tags. For example, the user may set search criteria by selecting the medium identity from a list of previous entered medium names. Alternatively, the user may type in characters for the medium name via a keyboard, for example, keyboard 120 of FIG. 1A. Alternatively, the user might look up medium name by providing data about the contents of the medium and searching the media inventory database. Yet another way a user sets search criteria may be to select a word that matches an annotation previously associated with the sought for medium. Search criteria may also include one or more medium unique identifiers that a processor looks up as being associated with medium names, album names and other content associated with the sought for medium.

The search criteria may suffice to uniquely identify a medium, as occurs when a medium name is selected. In response to this type of selection by the user, data processing system 100 determines whether the recorded medium is checked out (step 603). A status of "checked out" could include a number of different states, for example, loaned, left at the office, or lost.

If the determination is that the recorded medium is not checked out, data processing system 100 looks up a radio frequency transponder code according to the search criteria (step 605). The search criteria is met if the user selection matches the medium name. The search criteria may be one or more specific transponder codes that are associated with the name of a recorded medium. The search criteria may be expressed as a range of consecutive transponder codes.

A typical transponder code is 64 bits that a radio frequency transponder modulates on a frequency shift keyed waveform. A radio frequency reader sends an interrogate signal (step 607). The radio frequency reader may be, for example, radio frequency reader 144 of FIG. 1A. Data processing system 100 indicates a current status while waiting for a response to the signal (step 609). The current status may be, for example, "searching". Radio frequency reader 144 may receive a radio frequency response (step 611). A reader may generate a carrier signal, that is, a relatively unchanging radio frequency. Depending on the power output by the reader and the attenuating effects of distance, a radio frequency transponder may modulate the carrier wave with the transponder code. In addition to distance, the effects of multi-path and interference may limit the effective range of the reader with respect to a particular transponder. The radio frequency response may not necessarily match or correlate with the medium name or the given. The radio frequency reader determines if the reader has received a user input to change the status (step 613).

A status may be "new", "old", "lost", "at the office" or any other designator that might correlate with a location that a recorded medium may be located. As an example, "lost" is an abstract term that has a subjective meaning to the owner, generally implying that the item is unlikely to be in the home, work, car or other environments frequented by the user. An owner also includes someone who rents, borrows or otherwise controls the recorded medium. Consequently, the status is the subjective state that the one who owns or controls the recorded medium may assign to the recorded medium. Changing the status represents the current knowledge or intention of the owner with respect to the item. For example, the owner may be about to bring the recorded medium to the office, and so the owner may change a status from "home" to "office" just prior to leaving the home. Provided that data processing system 100 has not received a user input to change the status, the radio frequency reader determines if the response includes the medium unique identifier corresponding to the search criteria given in step 601 (step 615). Assuming that there is a match, data processing system 100 indicates that the status is found (step 619). However, if the response does not include the medium unique identifier, processing resumes at step 607.

If data processing system 100 receives a user input to change the status in step 613, data processing system 100 changes the status that corresponds to a medium name to a revised status (step 617). To accomplish this, data processing system 100 may operate a database having a write mechanism. The database may be, for example, RFID identity conversion database 203 of FIG. 2.

If data processing system 100 determines that the status for a medium name is "checked out" at step 603, data processing system 100 indicates the status of medium name to be "checked out" (step 621).

Processing may continue at step 605 wherein data processing system 100 resumes its search for a radio frequency transponder. An embodiment of the present invention may have two power settings for the reader to transmit an interrogate signal. A high power setting may be used to determine if the transponder is within a large location zone, while a low power setting may be used to determine if the transponder is in a small location zone. A location zone is a space within which a transponder may respond to a interrogate signal with a signal capable of being received by the radio frequency reader. A user may select the power level, through inputs, for example, of a keyboard 120 of FIG. 1A. A user may then determine if he is approaching the transponder by switching to low power and discovering the transponder remains detected by the reader. Switching to low power comprises transmitting a second interrogate signal at low power relative to the earlier interrogate signal. Methods such as triangulation and directional sensing through anisotropic antennas may also assist to narrow the location of a transponder. Provided the radio frequency reader receives a second responsive signal, radio frequency reader outputs the status change indication as a near indication. A status change indication is a visual or audible signal that denotes relative or previously recorded locations. A near indication is an indication, visible or audible, that indicates in a user's language, "found near". Other forms of status change indications may include merely displaying "found" when a transponder responds to a high power interrogate signal but not to a low power interrogate signal.

Data processing system 100 may use a network adapter to look up a radio frequency transponder code. The network adapter accesses a generic identity pair server to obtain the radio frequency transponder code that corresponds with the medium name. The network adapter may be, for example, network adapter 112 of FIG. 1A.

Radio frequency reader may receive a playing history as a user search criteria. The user may specify that the playing history be used as a search criteria when the user couples the radio frequency reader to a disk player suitably equipped to host a playing history. In addition, a user may set a search criteria based on the preliminary search criteria, wherein the radio frequency reader receives a selection of a subset of items in a playing history from the user. In this case, the preliminary search criteria are the broader set of criteria comprised by a playing history.

Associated with step 601 may be a two step process whereby a user identifies items in a collection of media that are stored to the user inventory. First, a user provides a query. The query comprises a user selected attribute. The user enters the query as a string or otherwise selects from a list presented on the radio frequency reader. A user selected attribute is a string or other selection that is among the annotations and content stored to the user inventory. A query may include a user identifier. Thus, in the example of a collection of music on disk, a user may select an artist name as the user selected attribute. The first step is to transmit the user selected attribute to the user inventory. Second, the radio frequency reader receives one or more hits that include one or more medium unique identifiers. The one or more medium unique identifiers then become the user's search criteria, and further processing continues at step 603.

Thus, the user, by using an embodiment of the present invention, may locate a desired medium by repeatedly moving from area to area until a radio frequency reader indicates that the desired or recorded medium has been found. On the other hand, a user may tire of searching for a recorded medium and may enter a new status for the medium name so that the medium name has a corresponding status stored in a user inventory. By changing the status in this manner, a user may truncate later searches because the radio frequency receiver may alert the user at the outset of searching that a medium name is checked out or otherwise unavailable.

The recorded medium may be optical or magnetic storage media. The recorded medium may be paper-based products, such as books, magazines, and manila file folders. A radio frequency transponder may be adhered, etched or otherwise formed into the material of the recorded medium. For example, if the recorded medium is a CD, a radio frequency transponder may be placed on any portion of the CD where printing may be placed, for example, the top side of a CD. When a recorded medium is said to have a unique identifier, the identifier is unique within the context of a collection of media owned or controlled by a user.

The invention can take the form of an entirely hardware embodiment, a primarily software embodiment or an embodiment containing both hardware and software elements. In a preferred embodiment, the present invention is implemented in software, which includes, but is not limited to, firmware, resident software, microcode, etc. It is appreciated that where the word 'criteria' is used, the term includes the singular 'criterion' within the term's scope.

Furthermore, the present invention can take the form of a computer program product accessible from a computer-usable or computer-readable medium providing program code for use by, or in connection with, a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The computer-usable or computer readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The illustrated embodiment of the present invention was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for locating a desired medium using a radio frequency reader, the computer implemented method comprising:
  connecting to an online identity pair server to locate an identity pair assigned to the desired medium, wherein the identity pair is assigned by a manufacturer of the desired medium, and wherein the identity pair comprises a radio frequency identifier and a content, wherein the content is a table of contents comprising corresponding attributes associated with the desired medium;
  receiving the identity pair assigned to the desired medium from the online identity pair server;
  receiving an annotation from a user, wherein the annotation is added to the content, and wherein the annotation is associated with the radio frequency identifier;
  storing the identity pair and the annotation in a user inventory comprising a plurality of identity pairs and corresponding attributes that are associated with a plurality of desired mediums, wherein the annotation is added to the plurality of corresponding attributes, wherein each corresponding attribute is at least one of an album name, a song name, the annotation, and a user tag, wherein the radio frequency reader stores the each identity pair in the user inventory, wherein the radio frequency reader is coupled to the data processing system;

inputting a user search criteria into the radio frequency reader to locate the desired medium, wherein the user search criteria uniquely identifies the desired medium, and wherein the user search criteria comprises a selection of corresponding attributes associated with the desired medium;

responsive to receiving the user search criteria for the desired medium, determining a status of the desired medium, wherein the status indicates the desired medium is checked out of the user inventory;

responsive to determining that the status of the desired medium is not checked out, locating the radio frequency identifier in the user inventory according to the user search criteria;

transmitting an interrogate signal containing the radio frequency identifier associated with the desired medium using the radio frequency reader;

receiving a radio frequency response having the radio frequency identifier in response to transmitting the interrogate signal indicating the status of the desired medium;

receiving a response from the user to input a status change for the desired medium;

responsive to receiving the status change for the desired medium, changing to a revised status;

responsive to an absence of the user to input the status change for the desired medium, making a determination whether the response includes the radio frequency identifier; and outputting the status change indication to a user interface, wherein the status change indicates a location of the desired medium.

2. A computer program product stored on a recordable computer useable medium storing executable instructions for locating a desired medium, the computer program product comprising:

instructions for connecting to an online identity pair server to locate an identity pair assigned to the desired medium, wherein the identity pair is assigned by a manufacturer of the desired medium, and wherein the identity pair comprises a radio frequency identifier and a content, wherein the content is a table of contents comprising corresponding attributes associated with the desired medium;

instructions for receiving the identity pair assigned to the desired medium from the online identity pair server;

instructions for receiving an annotation from a user, wherein the annotation is added to the content wherein the annotation is associated with the radio frequency identifier, and wherein the annotation becomes a searchable term in the user inventory;

instructions for storing the identity pair and the annotation in a user inventory comprising a plurality of identity pairs and corresponding attributes that are associated with a plurality of desired mediums, wherein the annotation is added to the plurality of corresponding attributes, wherein each corresponding attribute is at least one of an album name, a song name, the annotation, and a user tag, wherein the radio frequency reader stores the each identity pair in the user inventory, wherein the radio frequency reader is coupled to the data processing system;

instructions for inputting a user search criteria into the radio frequency reader to locate the desired medium, wherein the user search criteria comprises a selection of a corresponding attribute associated with the desired medium, wherein the user search criteria uniquely identifies the medium;

instructions for determining a status of the desired medium, wherein the status indicates the desired medium is checked out of the user inventory, in response to receiving the user search criteria for the desired medium;

instructions for locating the radio frequency identifier in the user inventory according to the user search criteria responsive to determining that the status of the desired medium is not checked out;

instructions for transmitting an interrogate signal containing the radio frequency identifier associated with the desired medium using the radio frequency reader;

instructions for receiving a radio frequency response having the radio frequency identifier in response to transmitting the interrogate signal indicating the status of the desired medium;

instructions for receiving a response from the user to input a status change for the desired medium;

instructions for changing to a revised status, in response to receiving the status change for the desired medium;

instruction for making a determination whether the response includes the radio frequency identifier, in response to an absence of the user to input the status change for the desired medium; and instructions for outputting the status change indication to a user interface, wherein the status change indicates a location of the desired medium.

3. An apparatus for locating a desired medium, the apparatus comprising:

a bus;

a storage device connected to the bus, wherein the storage device contains a computer useable program product;

a processor unit, wherein the processor unit executes the computer useable program product to connect to an online identity pair server to locate an identity pair assigned to the desired medium, wherein the identity pair is assigned by a manufacturer of the desired medium, and wherein the identity pair comprises a radio frequency identifier and a content, wherein the content is a table of contents comprising corresponding attributes associated with the desired medium; receive the identity pair assigned to the desired medium from the online identity pair server; receive an annotation from a user, wherein the annotation is added to the content wherein the annotation is associated with the radio frequency identifier: store the identity pair and the annotation in a user inventory comprising a plurality of identity pairs and corresponding attributes that are associated with a plurality of desired mediums, wherein the annotation is added to the plurality of corresponding attributes, wherein each corresponding attribute is at least one of an album name, a song name, the annotation, and a user tag, wherein the radio frequency reader stores the each identity pair in the user inventory, wherein the radio frequency reader is coupled to the data processing system; input a user search criteria into a radio frequency reader to locate the desired medium, a user search criteria, wherein the user search criteria comprises a selection of a corresponding attribute associated with the desired medium, wherein the user search criteria uniquely identifies the medium; determine a status of the desired medium, wherein the status indicates the desired medium is checked out of the user inventory in response to receiving the user search criteria for the desired medium; locate the radio frequency identifier in the user inventory according to the user search criteria responsive to determining that the status of the desired medium is not checked out; transmit an interrogate signal containing the radio frequency identifier associated with the desired medium using the radio frequency reader; receive a radio frequency response having the radio frequency identifier in response to transmitting the interrogate signal indicating the status of the desired medium; receive a response from the user to input a status change for the desired medium; change to a revised status in response to receiving the status change for the desired medium; make a determination whether the response includes the radio frequency identifier in response to an absence of the user to input the status change for the desired medium; and output the status change indication to a user interface, wherein the status change indicates a location of the desired medium.

* * * * *